3,313,849
METHOD FOR THE CATALYTIC OXIDATION OF HYDROCARBONS

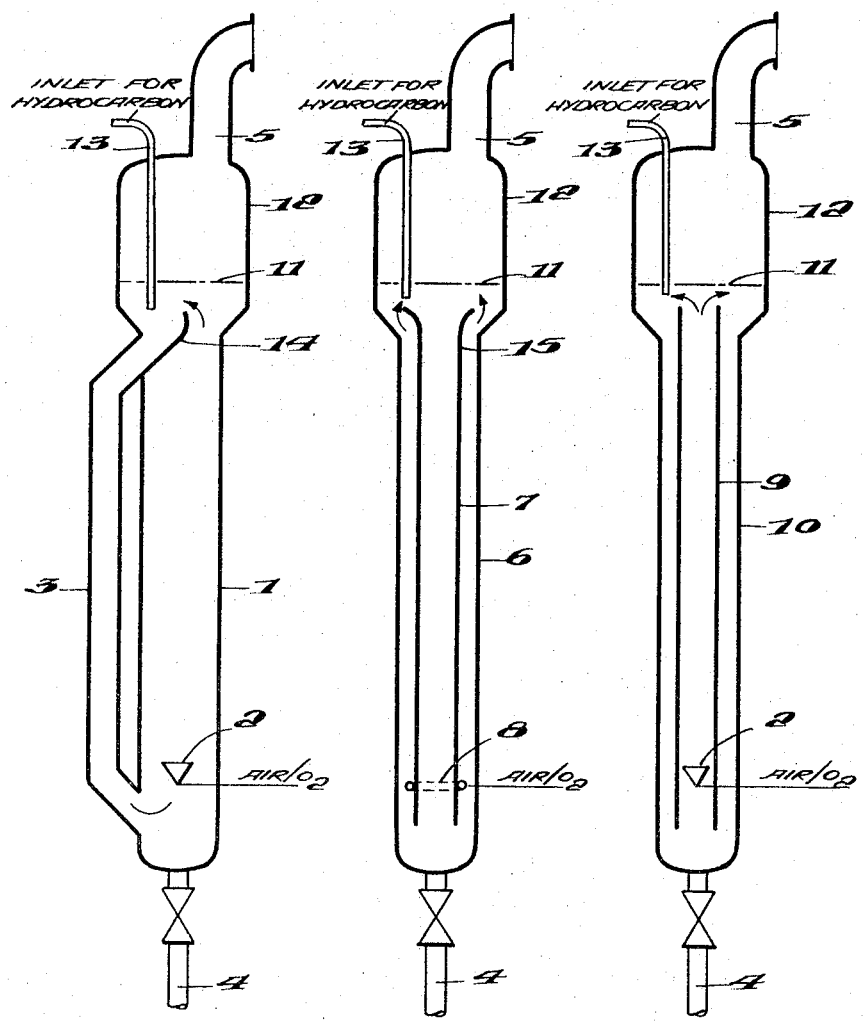

Ferdinand List, Günther Strauss, and Rudolf Ströbele, Marl, Germany, assignors to Chemische Werke Huls Aktiengesellschaft, Marl, Germany, a corporation of Germany
Filed Aug. 26, 1963, Ser. No. 304,390
Claims priority, application Germany, Oct. 6, 1962, C 28,111
1 Claim. (Cl. 260—524)

Several methods are known for the industrial oxidation of organic compounds of aromatic character as well as alicyclic and aliphatic hydrocarbons and their oxygen-containing derivatives in liquid state with ozone or oxygen-containing gases in the presence of suitable catalyzers and solvents. Usually acetic acid or propionic acid is used as solvent for the hydrocarbon to be oxidized and as catalyzers various heavy metal salts such as cobalt, manganese and cerium compounds are used usually in conjunction with lead or barium salts, preferably their bromides. The presence of bromine ions in the reaction mixture is considered a requisite for the further oxidation of intermediary oxidation substances which contain an inhibiting carboxyl group at satisfactory reaction rate.

This method therefore plays a major role, for example for the oxidation of dialkylbenzenes such as m- or p-xylene to isol- or terephthalic acid. Since the reaction is accomplished at high space-time yield it is possible to keep the dimensions of the required apparatus comparatively small.

This feature which per se is desirable as well as advantageous has one disadvantageous effect namely that the terephthalic acid, to give an example, is soluble with difficulty only in the solvents utilized, even at higher temperatures, as shown by the table below:

Solubility of the terephthalic acid in acetic acid

| ° C.: | Weight—percent of terephthalic acid |
| --- | --- |
| 150 | .97 |
| 159 | 1.30 |
| 171 | 1.57 |
| 186 | 2.02 |
| 199 | 2.51 |
| 212 | 2.97 |
| 219 | 3.63 |

Due to the low solubility the acid formed will precipitate immediately, depositing sediments and crusts on the walls of the apparatus and clogging lines, valves and air inlet nozzles. If operation is continuous the deposits will form in the oxidation column within a short period of time and particularly rapidly within the frit zone where there is a high oxygen concentration. Particularly troublesome is the fact that deposits, especially within the frit zone, are enamel-like and hard as stone, evidently due to local overheating which causes a partial dissolution of the terephthalic acid in the interior space and the crystallization by evaporation at the cooler walls. Frequently, thermal decomposition of the acid is observed in the frit zone.

In order to avoid these difficulties the standard equipment is provided with a stirrer, and air is introduced either below the stirring device or through the axis of the stirrer. The stirrer is provided for two reasons: first, to thoroughly mix the components of the reaction mixture (hydrocarbon, solvent, catalyzer, air) whereby the air migrating through the mixture will travel in a long and spiral path, and secondly to suspend continuously the insoluble reaction products. In addition, the arrangement is designed to attain a uniform distribution of the reaction heat throughout the column.

A pressure apparatus of this type, provided with a stirring device, has substantial deficiencies because the moving parts are subjected to great wear due to abrasion and also because the sealing can be accomplished only with difficulty due to the high pressure and high temperature employed during the oxidation process and the presence of very volatile and inflammable substances. Any leakage will cause loss of material and create a fire hazard. If the stirrer becomes inoperative, the injected air will rise by the shortest route through the reaction liquid and oxygen will filter into the gaseous area and form an explosive mixture.

If no stirrer is employed and the reaction mixture is circulated by means of intricate and delicate pumps suitable for high temperatures and pressures, stoppages and losses of material are encountered due to leaking stuffing boxes, glands and slip-ring gaskets.

Therefore, there exists an urgent industrial need for a method and apparatus which will permit the oxidation of hydrocarbons in the presence of bromine containing heavy metal compounds to be carried out without the use of moving parts and whereby the formation of deposits is eliminated even in continuous operations.

It has been found that these requirements can be met by a method for catalytic oxidation of hydrocarbons in the presence of solvents and suspended catalyzers at elevated pressure and temperature i.e. a method in which the oxidation is accomplished at 5 to 15, preferably 8 to 12 atmospheres in an upright reaction vessel which has a circulating system with the cross sectional area of the ratio of the reaction vessel to that of the circulating system within the range from 4:1 to 1:1, and especially approximately 2:1.

Upright so-called reaction towers are suitable reaction vessels. The circulating system can be designed in the form of an outer circulation as a pipe which begins at the upper part of the reaction vessel just below the liquid level and returns to the lower part, preferably immediately below the air inlet frit. Another species comprises an internal subdivision of the reaction zone, most suitably of cylindrical shape, by means of a pipe open at both ends and inserted axially into the reaction vessel to serve as circulating system with the annular outer part serving as air inlet and thereby as reaction zone. Particularly advantageous however is the inversely operating arrangement with the reaction zone located inside and the circulating system located outside.

Apparatus of the three types referred to above is illustrated in the accompanying drawings in which:

FIG. 1 is a diagrammatic vertical sectional view with parts shown in elevation of a reaction tower with an outer circulation pipe, FIG. 2 is a diagrammatic vertical sectional view with parts shown in elevation of a reaction tower provided with an internal circulation pipe, and FIG. 3 is a diagrammatic vertical sectional view with parts shown in elevation of a reaction tower in which the circulating pipe surrounds the reaction zone.

Referring to the drawings, in FIG. 1, 1 is the cylindrical reaction chamber, to which air or oxygen or oxygen enriched air is supplied through the frit 2, 3 is the external circulation pipe, 4 is a valved pipe for the withdrawal of the reaction products and solvent and 5 is a pipe for the discharge of unconsumed oxidation gas and gaseous products to a condenser (not shown). In FIG. 2 the reaction chamber 6 is cylindrical and the circulation pipe 7, mounted within the reaction chamber also is cylindrical. Oxidation gas is supplied to the reaction chamber through a ring 8. The parts 4 and 5 are the same as in FIG. 1. In FIG. 3 the reaction chamber is in the form of an internal cylindrical tube 9 surrounded by the annular circulation conduit 10. Air is supplied to the reaction chamber 9 by a frit 2 as in FIG. 1. The parts 4 and 5 are the same as in FIG. 1. In all three figures 11 marks the liquid level. In all three embodiments the wall of the reaction chamber (1, 6 and 10) is heat insulated and in the embodiment of FIG. 1 the external circulation pipe 3 is heat insulated, such heat insulation being not shown in the drawings. Also in all three embodiments 12 is a chamber at the top of the tower where separation of gas from liquid takes place. In all three figures 13 is an inlet for the hydrocarbon to be oxidized. In FIGS. 1 and 2, 14 and 15 are baffles.

Basically, utilization of apparatus for carrying out chemical reactions with a circulating system is not a new idea. However, it has been found that even by the use of a circulating system in connection with oxidations of the type in question it is still not possible to avoid the formation of crusts if the operation is carried out at standard pressures which range between 20 and 30 atmospheres. It has been found further that formation of deposits will not be prevented by use of a standard, comparatively narrow, circulating pipe.

In contrast thereto however the formation of crusts will cease entirely if lower pressures than are usual are employed for the oxidation, the suitable pressures ranging from 5 to 15, preferably from 8 to 12 atmospheres, and if a circulating system is utilized with its profile dimensioned in such manner that the ratio of the cross-section of the reaction vessel to that of the circulating system is within the range from 4:1 to 1:1, and preferably approximately 2:1.

It has been found further that it is advantageous for the prevention of deposits if the oxidation apparatus is not connected with the heretofore exclusively employed cooling systems, operated by refrigerants and if the heat of the reaction is extracted from the reaction mixture in the form of heat of vaporization. For this purpose it becomes necessary to efficiently insulate the walls of the tower as well as the circulating system, if placed outside the tower, and to condense the vapors emerging at the head of the tower. The condensation product can then be recycled either in whole or in part.

Referring to FIG. 1 the oxidation apparatus is most suitably designed in the form of a long, upright reaction tower 1, an air inlet frit 2, a condensing chamber (not shown) and an outer circulating pipe 3, its inlet being located below the air frit 2. The liquid is propelled upward in the tower 1 by the rising finely distributed air in the manner of an air-lift pump. The gas will blow upward while the liquid will run off gas-free into the circulating pipe from a suitably designed baffle 14. It is essential that the baffle is designed in such manner that the circulating flow at the shunting point remains free of vortices to prevent the carrying along of gas bubbles into the circulating pipe. Due to the dissimilarities in the specific weight of the column of liquid in the oxidation tower 1, mixed with a large amount of air, and the gas-free liquid in the circulating pipe 2 an intense circulation will be generated. The proper circulation of the tower contents can be determined and checked very accurately on the basis of the temperature conditions within the tower. Overheating must not be permitted within the frit area, its temperature being approximately 5 to 10° C. above the temperature of the flow of liquid entering the circulating pipe. The differences in temperature observed at the various points of the tower and the differences in the specific weight of the liquid at said points cause the gravity circulation effect which will intensify the air-lift pump effect.

The method is suitable for the oxidation of hydrocarbons especially hydrocarbons which result in compounds that are difficult to dissolve in the solvent employed, for example p-xylene and m-xylene. The method is suitable preferably for the oxidation of such aromatic alkylated hydrocarbons or their derivatives from which are generated aromatic dicarboxylic acids such as isophathalic acid and terephthalic acid.

The following is an example of the process as carried out in the apparatus illustrated in FIG. 1.

The oxidation tower of corrosion-proof material has a diameter of 180 mm. and a height of 6 m. The expanded head of the tower (diameter 400 mm.) which holds 100 liters is provided with a condenser (not shown), an exhaust stack 5 and an intake duct 13. At the lowest part of the tower there is provided a gas inlet frit 2 and at the bottom of the tower a pipe 4 for the continuous removal of the reaction mixture. The tower is provided with an outer circulating pipe 3, its lower outlet joining the tower directly below the air inlet frit. The upper part of the circulating pipe joins the reactor approximately 50 cm. below the surface of the liquid.

(a) The diameter of the circulating pipe is 80 mm. Therefore, the cross-section ratio of tower:circulating pipe is 5.07:1. p-Xylene, dissolved in acetic acid (1:5) is oxidized continuously under the following conditions:

temperature: 180 to 190° C.
pressure: 20 atmospheres
p-xylene charge: 35 kg./h.
catalyst: 1500 mg./l. of cobalt acetate, 1500 mg./l. of manganese acetate, 1200 mg./l. of barium bromide
rate of air flow: 110 to 120 Nm.$^3$/h.
gas velocity: 10 to 11 cm. per second based on unobstructed cross-section.

Every hour there are removed 45 kg. of terephthalic acid, suspended in acetic acid. After 30 hours of operations the tower is clogged within the frit area. At the other walls there is found a coating of terephthalic acid of 10 to 15 mm.

(b) Under the same conditions as set forth under (a) but at a pressure of 10 atmospheres and a gas velocity of 20 to 22 cm. per second, after 30 hours of operations there are found again heavy deposits within the tower.

(c) The circulating pipe has a diameter of 125 mm. and the cross-section ratio of tower:circulating pipe is 2.07:1. All other conditions remain as set forth under (a). After 35 hours of operations there are found heavy deposits, especially within the frit area.

(d) The circulating pipe has a diameter of 125 mm. The pressure within the tower is set at 10 atmospheres as under (b). Every hour there are introduced 40 kg. of p-xylene and 120 Nm.$^3$ of air. The yield of terephthalic acid is 60 kg. 11.5 of acid are obtained during the course of 190 hours. The tower as well as the circulating system do not show any deposits even though the operations lasted six times longer than previously.

The results obtained in the apparatus illustrated in FIGS. 2 and 3 are similar to those described above for the apparatus of FIG. 1.

The principle of the air-lift pump as well as the principle of gravity circulation are not novel. However, it has not been known heretofore that these circulating methods which can be employed for the transfer of easily movable liquids and suspensions are sufficient for the prevention of deposits of solids from suspensions of high concentrations of solids (10 to 20%), which normally will cause clogging of pipes and valves. In addition thereto it was unexpected that by use of this method of transfer the extraordinary rapid crust formation at the walls can be eliminated which otherwise would cause a complete clogging of the reactor within a short period of time. Heretofore, this oxidation reaction could therefore be accomplished only and exclusively by forced circulation utilizing mechanical means.

We claim:

Method for catalytic oxidation of p-xylene in the presence of a solvent selected from the group consisting of acetic acid and propionic acid and a suspended catalyst by means of an oxygen containing gas in an upright reaction vessel at 5 to 15 atmospheres pressure, said reaction vessel being provided with a circulating system, the cross-section of the reaction vessel having a ratio in relation to that of the circulating system of from 4:1 to 1:1, and removing the heat of the reaction from the mixture substantially completely in the form of heat of vaporization.

References Cited by the Examiner
UNITED STATES PATENTS 2,378,342  6/1945  Voorhees et al. _____ 23—299.3
2,963,509  12/1960  Barker et al. _____ 260—524
3,161,476  12/1964  Lemetre et al. ____ 260—524 X LORRAINE A. WEINBERGER, *Primary Examiner.*

S. B. WILLIAMS, *Assistant Examiner.*